July 17, 1962  J. E. HEGGY  3,045,109
WELDING ELECTRODE HOLDER
Filed Sept. 22, 1960

INVENTOR.
James E. Heggy
BY Ooms, McDougall, Williams & Hersh
Att'ys

United States Patent Office 3,045,109
Patented July 17, 1962

3,045,109
WELDING ELECTRODE HOLDER
James E. Heggy, P.O. Box 65, Divernon, Ill.
Filed Sept. 22, 1960, Ser. No. 57,761
7 Claims. (Cl. 219—143)

This invention relates to arc welding apparatus and more particularly to an electrode holder for such apparatus.

The invention has for one of its objects the improvement and simplification of the construction of electrode holders.

A further object is to provide a new and improved electrode holder which is arranged so that welding electrodes may be inserted very readily into the holder, yet will be held with a strong grip.

Another object is to provide a new and improved electrode holder which may be operated easily with either hand.

A further object is to provide a holder which will hold an electrode at a variety of angles.

Another object is to provide a new and improved electrode holder having a clamp operating spring which may readily be adjusted or replaced, as needed.

Another object of this invention is to provide an improved electrode holder having a simple structure for easy attachment to an electric cable.

Still another object of this invention is to provide a simple electrode holder which has easily accessible means for adjusting the grip of the holder.

These and other objects of the invention will appear from the following description, taken with the accompanying drawing, in which.

Figure 1:
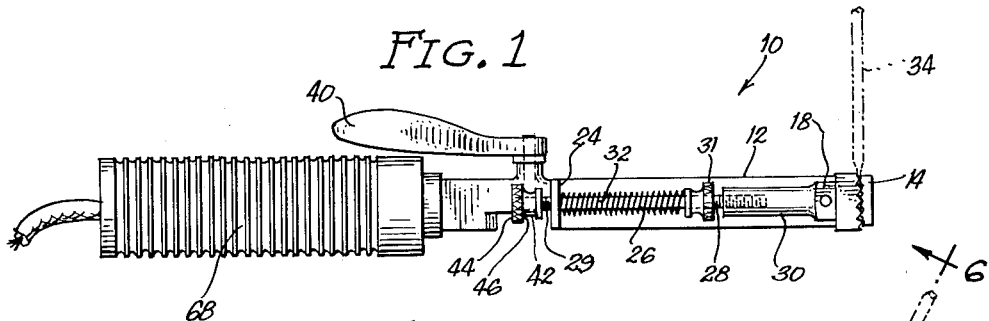
FIG. 1 is a top plan view of the improved electrode holder.
Figure 2:
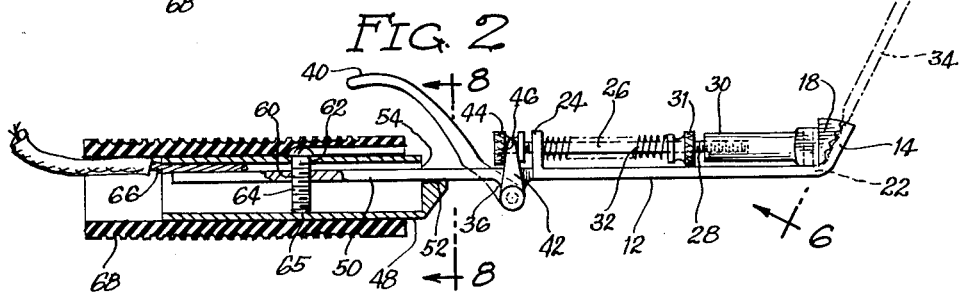
FIG. 2 is a side elevational view, partly in section, to show the tubular handle construction.
Figures 6, 7, 8:
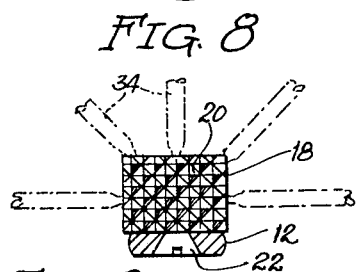
FIG. 6 is a sectional view taken on the line 6—6 of FIG. 2, showing the serrated surface of the movable clamping jaw, various possible positions of the electrode being shown in broken lines.
FIG. 7 is a sectional view taken on the line 7—7 of FIG. 5.
FIG. 8 is a sectional view taken on the line 8—8 of FIG. 2, but with the operating lever omitted.

Referring now to FIG. 1 of the drawing, the improved electrode holder, indicated generally by the reference numeral 10, comprises a bar 12 which is generally rectangular in cross section. A fixed jaw 14 is formed at one end of the bar and is disposed at an angle with respect thereto, as shown in FIG. 2. The bar 12 is provided with an elongated guide slot 16 adjacent the fixed jaw 14, see FIG. 3. A movable jaw member 18 is positioned on the bar 12 facing the fixed jaw 14. As shown in FIGS. 2 and 6, the facing surfaces 20 of the fixed jaw 14 and the movable jaw member 18 are serrated for reasons to be described below.

A bolt or rod 22 extends through the elongated slot 16 into engagement with the movable jaw member 18. The bolt 22 holds the movable jaw member on the bar 12 and both guides and limits its movement away from the fixed jaw 14 for reasons to become apparent below.

An upstanding lug 24 is secured to one surface of the bar, as shown in FIGS. 1 and 2. A rod 26 is slidable through an opening in the lug 24. The rod 26 is provided with threaded end portions 28 and 29. The end portion 28 is secured to a tubular extension 30 which is rigidly attached to the movable jaw member 18, as shown in FIGS. 1 and 2. A knurled nut 31 is in threaded engagement with the end portion 28 of the rod 26. A coil spring 32 is mounted on the rod 26. It will be seen that the ends of the spring 32 bear against the lug 24 and the nut 31 to bias the movable jaw member 18 against the fixed jaw 14.

As shown in FIG. 2, a welding electrode 34 may be clamped between the fixed jaw 14 and the movable jaw 18. Because of the serrated facing surfaces 20 on the jaws 14 and 18, the electrode 34 can be held in a variety of positions as shown by the dotted lines in FIG. 6. Additionally, by rotating the knurled nut 31 on the end portion 28 of the rod 26, the spring tension and hence the biasing force on the movable jaw portion 18 can be varied, as necessary.

Figure 3:
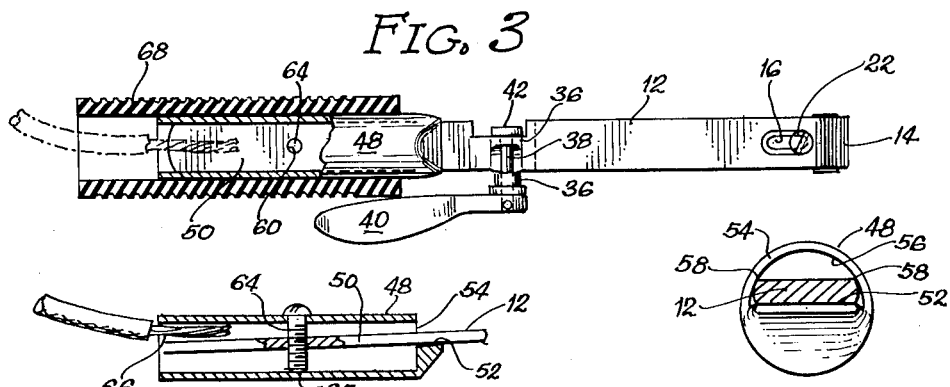
FIG. 3 is a bottom plan view, partly in section, to show other details of the handle construction.

A pair of spaced parallel ear members 36 extend out from the surface of bar 12 opposite the lug 24, as shown in FIG. 3. Aligned shaft-receiving openings are formed in these ear members for rotatably supporting a shaft 38. An insulated operating lever 40 is rigidly secured to one end of the shaft 38 and a push arm 42 is rigidly secured to the other end of the shaft 38.

A knurled nut 44 is threaded on the end portion 29 of the rod 26, as shown in FIG. 1. This nut is provided with a surface 46 in the path of the push arm 42. When torque is exerted on the operating lever 40, the push arm 42 is forced against the surface 46. Since nut 44 is connected with the rod 26 and the movable jaw 18, the engagement of the push arm 42 with the surface 46 causes the movable jaw member 18 to move away from the fixed jaw 14, so that the electrode may be inserted between the jaws. In so moving, the movable jaw member 18 is guided on bar 12 by the coaction between slot 16 and the bolt or rod 22.

By removing the screw 22 and the nut 44, the holder may readily be disassembled, if it ever becomes necessary to replace the spring 32 or any other part.

A tubular sleeve 48 receives the end portion 50 of bar 12 remote from the jaw 14. The tubular sleeve 48 is circular in cross section, as shown in FIG. 7, although this shape is not critical. In addition, the sleeve 48 has an inner width dimension greater than the width of the bar 12.

Figure 4:
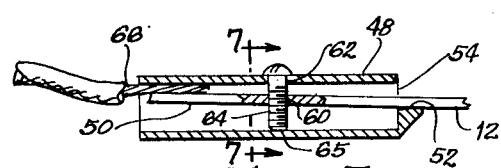
FIG. 4 is a sectional view taken through a portion of the tubular handle to show the manner in which the electric cable is inserted prior to being clamped.
Figure 5:
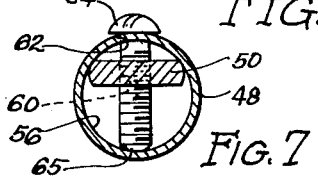
FIG. 5 is a view similar to FIG. 4 but with the electric cable clamped inside the tubular handle.

As best seen in FIGS. 2 and 8, a platform 52 is formed at the entrance 54 of the sleeve 47. This platform partially closes or blocks the entrance to the interior of the tubular sleeve 48 so that the end portion 50 of bar 12 must pass over the platform 52 to enter the sleeve. The platform is positioned so that the portion of the bar 12 at the sleeve entrance 54 is forced against the inner wall 56 of the sleeve 48, as shown in FIG. 8. With this arrangement, the portions 58 of the inner wall 56 contacted by the sides of the bar 12 function as pivots to permit a swinging movement of the end portion 50 of the bar 12 inside the sleeve 48, as shown in FIGS. 4 and 5.

The bar 12 is provided with a threaded bolt receiving opening 60 extending therethrough. An aligned bolt receiving opening 62 extends through the wall of the sleeve 48. The platform 52 has the added function of orienting bar 12 so the threaded opening 60 moves into alignment with the wall opening 62 as the end portion 50 of the bar 12 is moved into the sleeve 48.

A bolt 64 extends through the opening 62 and into threaded engagement with the opening 60 in the bar 12, as shown in FIG. 7. In the illustrated embodiment, the bolt 64 is long enough so that its end 65 bears against the inner wall 56 of the sleeve. With this arrangement further rotation of the bolt 64 in one direction with the bolt 64 bearing against the sleeve pivots the end portion 50 of the bar 12 inside sleeve 48 from the position shown in FIG. 4 to the position shown in FIG. 5. Consequently, if the end of an electric cable 66 is placed inside the tubular sleeve above the end portion 50 of bar 12, the cable can be electrically and rigidly connected to the bar 12 by tightening the bolt 64. At the same time, the tubular sleeve 48 is rigidly secured to bar 12.

An insulating sleeve 68 formed from a thermally and electrically insulating material is fitted over the tubular sleeve 48 to form a handle adapted to protect the hands of the welder from electricity and heat. Consequently, the tubular sleeve 48 has a plurality of functions in that it forms a part of the clamp for the electric cable, while providing the core of the insulating handle.

The invention may be embodied in other forms without departing from the spirit or essential characteristics thereof as set forth in the claims, and the present embodiment is therefore to be considered as illustrative and not restrictive. It is intended to include all changes which come within the scope and range of the claims.

I claim:

1. An electrode holder comprising in combination a bar, a fixed jaw secured at one end to said bar and at an obtuse angle thereto, said bar having an elongated guide slot formed therein adjacent said fixed jaw, a movable jaw member facing said fixed jaw, means extending through said guide slot and into engagement with said movable jaw member for holding said movable jaw member on said bar and limiting its movement away from said fixed jaw, a lug mounted on said bar, said lug having an opening extending therethrough, a rod extending through said opening and connected to said movable jaw member, a coil spring mounted on said rod and bearing against said lug and said movable jaw member to bias said movable jaw member against said fixed jaw, a shaft rotatably mounted on said bar, an operating lever secured at one end to said shaft and an arm secured to the opposite end of said shaft, a member on the end of said rod having a surface in the path of said arm whereby when said operating lever is moved in one direction said arm pushes against said surface to move said movable jaw member away from said fixed jaw.

2. An electrode holder comprising, in combination, a bar, a fixed jaw secured at one end of said bar, a movable jaw mounted on said bar and facing said fixed jaw, biasing means connected to said movable jaw for biasing it toward said fixed jaw, means for separating said jaws, a tubular sleeve receiving the opposite end of said bar, means at the entrance of said sleeve for holding the portion of said bar at the sleeve entrance against the inner wall of said sleeve whereby said inner wall at the entrance of said sleeve functions as a pivot for the bar to permit swinging movement of the free end of said bar inside said sleeve, said bar having a threaded bolt receiving hole extending therethrough, said sleeve having a bolt receiving opening extending through a wall thereof, a bolt extending through said bolt receiving opening in the sleeve wall and into threaded engagement with the threaded hole in said bar with a portion of said bolt adapted to bear against said sleeve so that rotation of said bolt in one direction pivots the bar so its free end moves into engagement with the inner walls of the sleeve whereby an electric cable positioned between the bar and the inner wall of the sleeve is clamped into electric contact with said bar while said bar is locked inside said sleeve.

3. The electrode holder according to claim 2 including an insulating sleeve formed from a thermal and electrical insulating material, said insulating sleeve being mounted on said tubular sleeve to form a protective handle for the electrode holder.

4. The electrode holder according to claim 2 wherein said means at the entrance of said sleeve for holding the portion of said bar at the sleeve entrance against the inner wall of the sleeve comprises a platform partially blocking the entrance of said bar into said sleeve, said platform being positioned so the bar must pass over said platform to enter said sleeve and in so doing is forced against the inner wall of said sleeve at the sleeve entrance, said platform further orienting said bar so its threaded opening moves into alignment with the wall opening through the sleeve as the bar is inserted into the sleeve.

5. The electrode holder according to claim 4 including an insulating sleeve formed from a thermal and electrical insulating material, said insulating sleeve being mounted on said tubular sleeve to form a protective handle for the electrode holder.

6. In an electrode holder, the combination comprising an elongated bar, a fixed jaw formed at the outer end of said jaw and extending at an obtuse angle thereto, a movable jaw movable along said bar and having an angular face engageable with said fixed jaw, means for retaining said movable jaw on said bar while guiding said movable jaw for sliding movement toward and way from said fixed jaw, a lug mounted on said bar and having a guide opening therein, a threaded rod connected to said movable jaw and slidably received in said opening in said lug, a nut threaded onto said rod between said lug and said movable jaw, a coil spring mounted on said rod and compressed between said lug and said nut for biasing said movable jaw against said fixed jaw, said nut being rotatable to adjust the force of said spring, a lever swingably mounted on said bar and having an arm adjacent said rod, and an enlarged member on said rod and engageable by said arm so that swinging movement of said lever will retract said movable jaw from said fixed jaw.

7. An electrode holder comprising, in combination, a bar, fixed and movable jaws mounted on the outer end of said bar for holding an electrode, a tubular sleeve receiving the inner end portion of said bar, said sleeve having an inner width dimension greater than the width of said bar to provide for swinging movement of the free inner end of said bar inside said sleeve, said bar having a threaded bolt-receiving hole extending therethrough and spaced from said free inner end thereof, said sleeve having a bolt-receiving opening extending through a wall thereof, a bolt extending through said bolt-receiving opening in the sleeve wall and into threaded engagement with the threaded hole in said bar, said bolt having a head portion adapted to bear against said sleeve so that rotation of said bolt in one direction will swing the free end of the bar into engagement with the inner walls of the sleeve whereby an electric cable positioned between the free end of the bar and the inner wall of the sleeve is clamped into electric contact with said bar while said bar is locked inside said sleeve.

References Cited in the file of this patent

UNITED STATES PATENTS

| | | |
|---|---|---|
| 1,345,817 | Williams | July 6, 1920 |
| 2,416,872 | Garibay | Mar. 4, 1947 |
| 2,438,990 | Brown | Apr. 6, 1948 |

FOREIGN PATENTS

| | | |
|---|---|---|
| 578,448 | Germany | Mar. 3, 1933 |